(12) United States Patent
Tanizaki et al.

(10) Patent No.: US 8,286,990 B2
(45) Date of Patent: Oct. 16, 2012

(54) STROLLER

(75) Inventors: Masashi Tanizaki, Saitama (JP);
Morihiko Fujita, Saitama (JP); Junichi Asano, Saitama (JP)

(73) Assignee: Combi Corporation, Tokyo-To (JP)

( * ) Notice: Subject to any disclaimer, the term of this patent is extended or adjusted under 35 U.S.C. 154(b) by 248 days.

(21) Appl. No.: 12/629,529

(22) Filed: Dec. 2, 2009

(65) Prior Publication Data

US 2010/0133789 A1 Jun. 3, 2010

(30) Foreign Application Priority Data

Dec. 3, 2008 (JP) ................................. 2008-308639

(51) Int. Cl.
*B62B 1/00* (2006.01)
*A47C 4/00* (2006.01)
(52) U.S. Cl. ........ 280/642; 280/643; 280/647; 280/648; 280/650; 297/35
(58) Field of Classification Search .................. 280/642, 280/643, 647, 648, 649, 650; 297/35, 47, 297/48, 50, 55, 58
See application file for complete search history.

(56) References Cited

U.S. PATENT DOCUMENTS

| | | | | |
|---|---|---|---|---|
| 5,794,951 A | * | 8/1998 | Corley et al. | 280/643 |
| 5,865,447 A | * | 2/1999 | Huang | 280/30 |
| 5,947,555 A | * | 9/1999 | Welsh et al. | 297/130 |
| 6,120,054 A | * | 9/2000 | Hu | 280/650 |
| 6,398,233 B1 | * | 6/2002 | Liang et al. | 280/30 |
| 6,409,205 B1 | * | 6/2002 | Bapst et al. | 280/642 |
| 6,428,034 B1 | * | 8/2002 | Bost | 280/650 |
| 6,843,499 B2 | * | 1/2005 | Guo | 280/642 |
| 7,513,512 B2 | * | 4/2009 | Yoshie et al. | 280/47.38 |
| 7,938,435 B2 | * | 5/2011 | Sousa et al. | 280/658 |
| 8,100,429 B2 | * | 1/2012 | Longenecker et al. | 280/642 |
| 8,172,253 B2 | * | 5/2012 | Song | 280/642 |
| 2004/0145157 A1 | | 7/2004 | Guo | |
| 2004/0164593 A1 | | 8/2004 | Santamaria | |

FOREIGN PATENT DOCUMENTS

| | | |
|---|---|---|
| DE | 203 18 455 U1 | 11/2003 |
| JP | 2007-098995 | 4/2007 |

* cited by examiner

*Primary Examiner* — Jeffrey J Restifo
*Assistant Examiner* — James M Dolak
(74) *Attorney, Agent, or Firm* — Birch, Stewart, Kolasch & Birch, LLP

(57) ABSTRACT

There is provided a stroller which has armrests that are attachable and detachable to and from a stroller body, and which is capable of attaching a child seat to the stroller body without using particular attachments. The stroller includes: a pair of front legs; a pair of handles pivotably mounted to the pair of front legs; a pair of rear legs pivotably mounted to the pair of handles; and an X-shaped hinge, coupled to the pair of front legs and the pair of rear legs, for converting the pair of front legs and the pair of rear legs from an unfolded state to a folded state, wherein a pair of armrests is provided, each between each handle and the front leg corresponding to the handle, such that each armrest is attachable and detachable to and from the handle and the front leg.

17 Claims, 10 Drawing Sheets

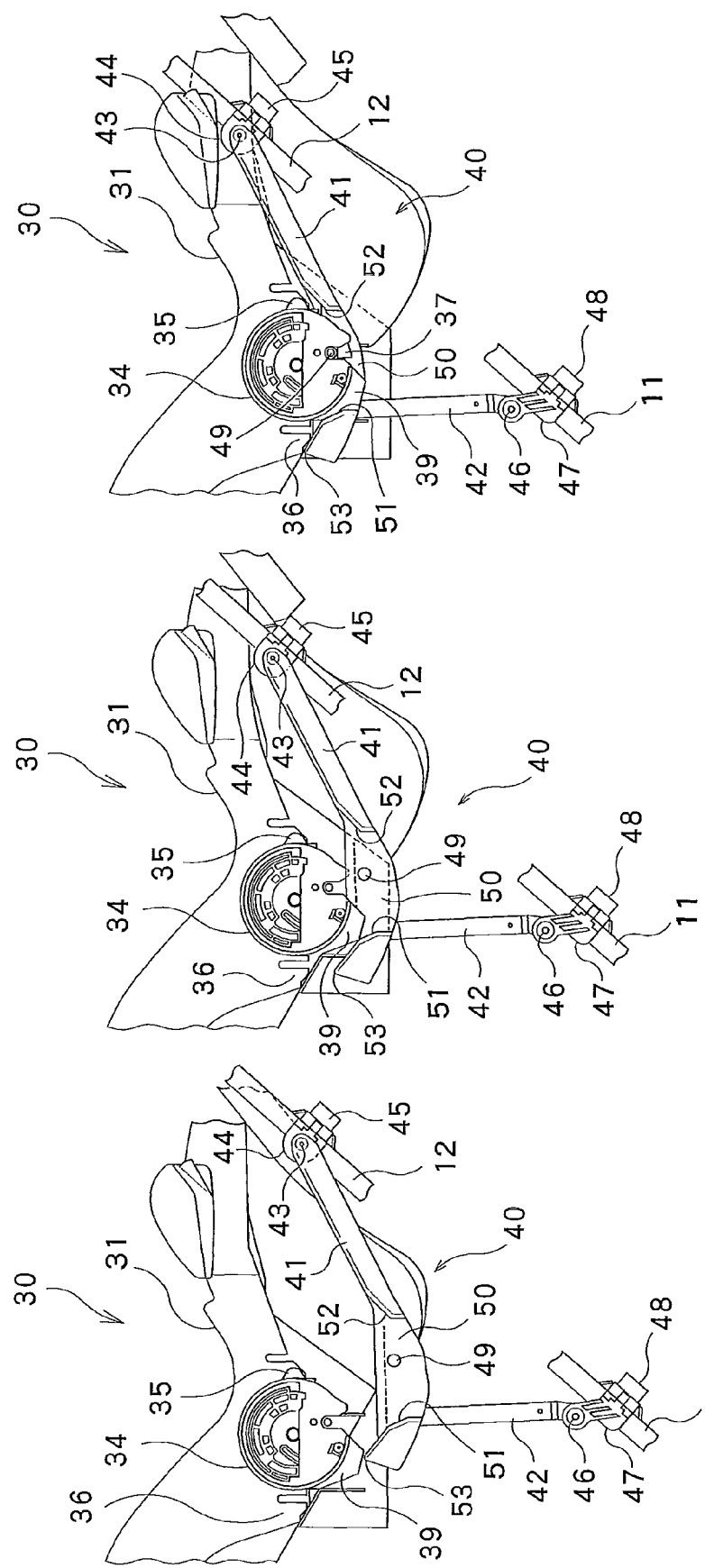

STROLLER

BACKGROUND OF THE INVENTION

1. Field of the Invention

The present invention relates to a foldable stroller capable of attaching a child seat thereto, in particular a stroller having detachable armrests.

2. Background Art

A child seat, attached to a car seat in a car, is generally used when putting an infant, e.g. less than one year old, in the car. A stroller capable of attaching a child seat thereto has been proposed. When traveling by a car with an infant in the child seat secured to a car seat, the child seat with the infant lying therein can be detached from the car seat after arriving at a destination. The child seat can then be attached to the stroller for use as a stroller seat, facilitating travel in the destination.

On the other hand, when putting an infant, e.g. from one to two years old, in a stroller, the infant can be put directly in the seat of the stroller without using a child seat.

A stroller, which is capable of attaching a child seat thereto as described above, generally uses particular attachments to attach the child seat to the stroller body. Such attachments generally cannot be detached from the stroller even when an infant is put directly in the seat of the stroller without using the child seat.

Some strollers have armrests. In such a conventional stroller, armrests cannot be detached from the stroller body. Thus, the armrests, even when not in use, remain secured to the stroller body.

Such a conventional stroller having armrests is described, for example, in Japanese Patent Publication No. 2007-98995.

SUMMARY OF THE INVENTION

The present invention has been made in view of the above situation in the background art. It is therefore an object of the present invention to provide a stroller which has armrests that are attachable and detachable to and from a stroller body, and which is capable of attaching a child seat to the stroller body without using particular attachments.

In order to achieve the object, the present invention provides a stroller comprising: a pair of front legs; a pair of handles pivotably mounted to the pair of front legs; a pair of rear legs pivotably mounted to the pair of handles; and an X-shaped hinge, coupled to the pair of front legs and the pair of rear legs, for converting the pair of front legs and the pair of rear legs from an unfolded state to a folded state, wherein a pair of armrests is provided, each between each handle and the front leg corresponding to the handle, such that each armrest is attachable and detachable to and from the handle and the front leg.

In a preferred embodiment of the present invention, a seat, including a seat bottom and a seat back, is provided between the pair of front legs and the pair of handles.

In a preferred embodiment of the present invention, the stroller further comprises a pair of connecting pipes each connecting each front leg and each rear leg; and the seat bottom of the seat is supported by the pair of connecting pipes and the seat back of the seat is held by a suspender belt mounted to the pair of handles.

In a preferred embodiment of the present invention, the stroller further comprises a child seat which is attachable and detachable to and from the pair of armrests.

In a preferred embodiment of the present invention, an outwardly-protruding pin is provided on the outer side surface of each armrest, and locking devices, which each engage each of the protruding pins to secure the child seat to the pair of armrests, are provided on both sides of the child seat.

In a preferred embodiment of the present invention, each armrest has a first engagement portion at its front end and a second engagement portion located posterior to the first engagement portion, and the child seat has a pair of first contact portions each for contact with the first engagement portion of each armrest, and a pair of second contact portions each for contact with the second engagement portion of each armrest; and the first engagement portions of the armrests engage the pair of first contact portions of the child seat and the second engagement portions of the armrests engage the pair of second contact portions of the child seat so as to prevent the child seat from falling off the pair of armrests when at least one of the locking devices is off the corresponding protruding pin of the armrest.

In a preferred embodiment of the present invention, each armrest includes an armrest body mounted to the handle, and a support lever mounted to the front leg and pivotable with respect to the armrest body.

In a preferred embodiment of the present invention, when folding the stroller, such a gap as not to catch a finger is formed between each front leg and the support lever of each armrest, between the support lever of each armrest and the armrest body and between the armrest body of each armrest and each handle.

In a preferred embodiment of the present invention, a housing recess for housing the locking device is formed in one side surface of each armrest.

In a preferred embodiment of the present invention, the housing recess has an anterior slope positioned anteriorly in the direction of forward movement of the stroller, and a posterior slope positioned posteriorly in the direction of forward movement of the stroller.

According to the present invention, the pair of armrests is provided, each between each handle and the front leg corresponding to the handle, such that each armrest is attachable and detachable to and from the handle and the front leg. This enables attachment of the armrests to the stroller only during use of the armrests and detachment of the armrests during nonuse thereof.

According to the present invention, owing to the provision of the child seat which is attachable and detachable to and from the pair of armrests, the child seat can be attached to the stroller without using particular attachments.

Furthermore, according to the present invention, the first engagement portions of the armrests engage the pair of first contact portions of the child seat and the second engagement portions of the armrests engage the pair of second contact portions of the child seat. This can securely prevent the child seat from falling off the pair of armrests even when the child seat is not properly attached to each armrest and at least one of the locking devices is off the corresponding protruding pin of the armrest.

In addition, according to the present invention, when folding the stroller, such a gap as not to catch a finger is formed between each front leg and the support lever of each armrest, between the support lever of each armrest and the armrest body and between the armrest body of each armrest and each handle. There is, therefore, no fear of a user's finger being caught in the gap upon folding of the stroller. The safety of the stroller can thus be enhanced.

BRIEF DESCRIPTION OF THE DRAWINGS

FIGS. 11A through 11C are side views illustrating the operation of attaching the child seat to the armrests.

DETAILED DESCRIPTION OF THE PREFERRED EMBODIMENT

A preferred embodiment of the present invention will now be described in detail with reference to the drawings.

Figure 1:
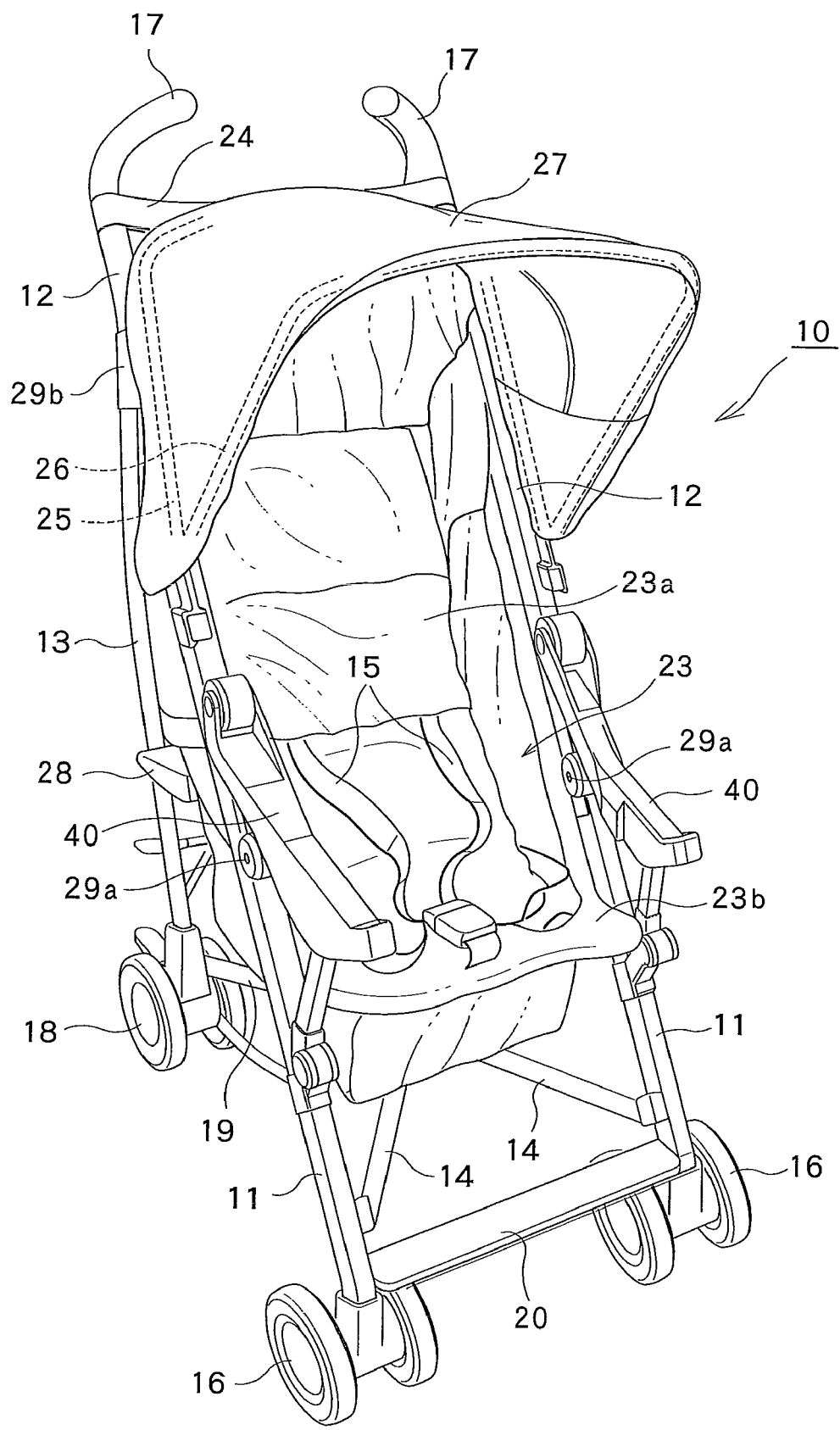
FIG. 1 is a perspective front view of a stroller according to an embodiment of the present invention.
Figure 2:
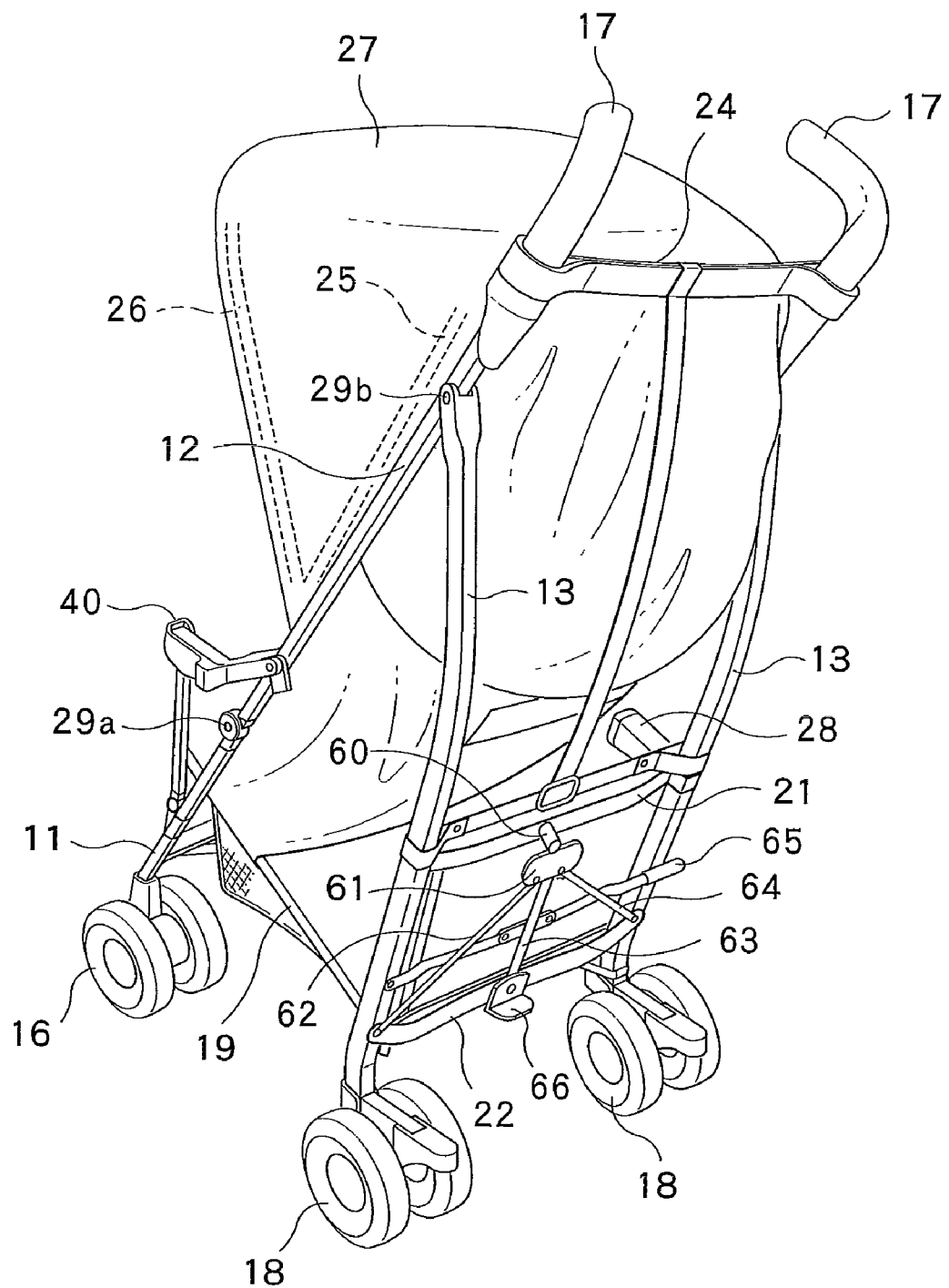
FIG. 2 is a perspective rear view of the stroller.

At the outset, a stroller according to this embodiment will be outlined with reference to FIGS. 1 through 3.

As shown in FIGS. 1 through 3, the stroller 10 of this embodiment includes a pair of front legs 11 having, at their lower ends, front wheels 16 mounted thereto, and a pair of handles 12 pivotably mounted to the pair of front legs 11 via first pivot sections 29a. The handles 12 each have a handle grip 17 at the upper end. A pair of rear legs 13 is pivotably mounted to the pair of handles 12 via second pivot sections 29b. The rear legs 13 have, at their lower ends, rear wheels 18 attached thereto.

As shown in FIG. 1, an X-shaped hinge 14 is coupled to lower portions of the pair of front legs 11 and to lower portions of the pair of rear legs 13. The X-shaped hinge 14 is to convert the pair of front legs 11 and the pair of rear legs 13 from a wide unfolded state to a narrow folded state.

Figure 3A:
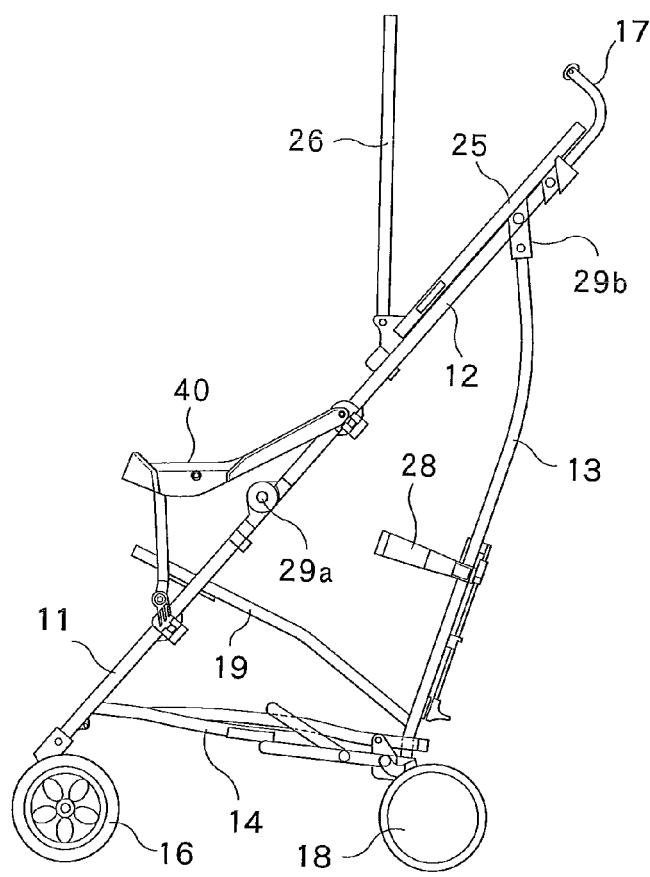
FIG. 3A is a side view of the stroller in an unfolded state.

The "unfolded state" refers to a state in which, as shown in FIG. 3A, the front legs 11, the handles 12 and the rear legs 13 are open, so that an infant can be put in the stroller 10. In the unfolded state, the width between the front legs 11 and the Width between the rear legs 13 are both broadened.

Figure 3B:
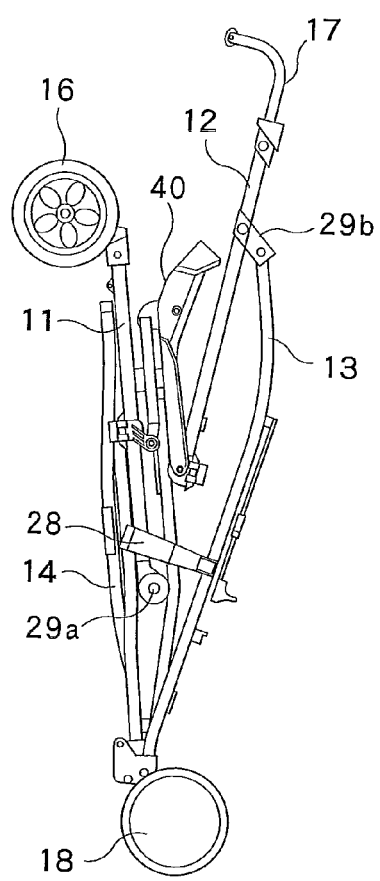
FIG. 3B is a side view of the stroller in a folded state.

On the other hand, the "folded state" refers to a state in which, as shown in FIG. 3B, the front legs 11 have been folded, through their pivoting about the first pivot sections 29a, near to the handles 12, and in which the front legs 11, the handles 12 and the rear legs 13 are closer to each other. In the folded state, the width between the front legs 11 and the width between the rear legs 13 are both narrowed, making it easy to house or carry the stroller 10. The stroller 10 can be kept in the folded state shown in FIG. 3B by engaging a hook 28, attached to the rear leg 13, with the front leg 11.

As shown in FIG. 1, a step 20 for an infant to put their feet on is provided horizontally between the pair of front legs 11. Further, as shown in FIGS. 1 and 2, a seat 23 in which an infant is to be put is provided between the pair of front legs 11 and the pair of handles 12.

The seat 23 includes a seat back 23a which is to make contact with the back of a seated infant, and a seat bottom 23b which is to make contact with the buttocks of the seated infant. Thus, an infant is put in the seat 23 with the infant's back facing the rear side of the stroller 10 (face-to-back manner). The seat back 23a of the seat 23 is pivotable with respect to the seat bottom 23b so that the inclination of the seat back 23a can be adjusted. Further, the seat 23 is provided with a seat belt 15 for safely fixing an infant to the seat 23.

The stroller 10 also includes a pair of connecting pipes 19 each connecting a generally central portion of each front leg 11 and a lower end portion of each rear leg 13. The front end of each connecting pipe 19 protrudes forward from the front leg 11 when the stroller 10 is in the unfolded state. The seat bottom 23b of the seat 23 is supported by the front ends of the pair of connecting pipes 19. On the other hand, the seat back 23a of the seat 23 is held by a suspender belt 24 provided between the upper ends of the pair of handles 12.

As shown in FIG. 2, the rear legs 13 are connected to each other by a first rear stay 21 and a second rear stay 22 provided below the first rear stay 21. The first rear stay 21 and the second rear stay 22 each extend horizontally in the unfolded state of the stroller 10. On the other hand, when the stroller 10 is folded, the first rear stay 21 and the second rear stay 22 each bend at the center and take the form of a chevron shape.

A center portion of the first rear stay 21 and a center portion of the second rear stay 22 are connected by a vertically-extending center link 63. Link arms 62, 64, each at one end, are pivotably coupled to both ends of the second rear stay 22. The other ends of the link arms 62, 64 are pivotably coupled to a link connector member 61.

A center protrusion 60, protruding backward, is provided in the center of the first rear stay 21. The center protrusion 60 is in contact with the upper end of the link connector member 61 when the stroller 10 is in the unfolded state. In FIG. 2, reference numerals 65 and 66 denote a locking lever and a locking pedal, respectively, to be used when folding or unfolding the stroller 10.

The stroller 10 of this embodiment is configured to form, when it is folded, such a gap as not to catch a finger between the first rear stay 21 and each link arm 62, 64 and between each link arm 62, 64 and the second rear stay 22. This prevents a user's finger from being caught in the gap upon folding of the stroller 10, thereby enhancing the safety of the stroller 10. The expression "such a gap as not to catch a finger" refers to a gap having a width which is larger than an ordinary user's finger diameter, for example, a width of 14 mm or more.

As shown in FIGS. 1 and 2, a first hood frame 25 is secured to the handles 12. Further, a second hood frame 26 is pivotably mounted to the handles 12. A hood 27 for protecting an infant from the sun or rain is provided over the first hood frame 25 and the second hood frame 26. The hood 27 can be opened and closed by pivoting the second hood frame 26 back and forth with respect to the first hood frame 25.

As shown in FIGS. 1 and 2, an armrests 40 is provided between each handle 12 and the front leg 11 corresponding to the handle 12. Each armrest 40 is attachable and detachable to and from the handle 12 and the front leg 11, as will be described later.

The construction of the armrest 40 will now be described with reference to FIGS. 4 through 6. The right and left armrests 40 have symmetrical structures, and hence a description will be made solely of the armrest 40 positioned on the left side of the stroller 10 as viewed from the back of the stroller 10.

Figure 4:
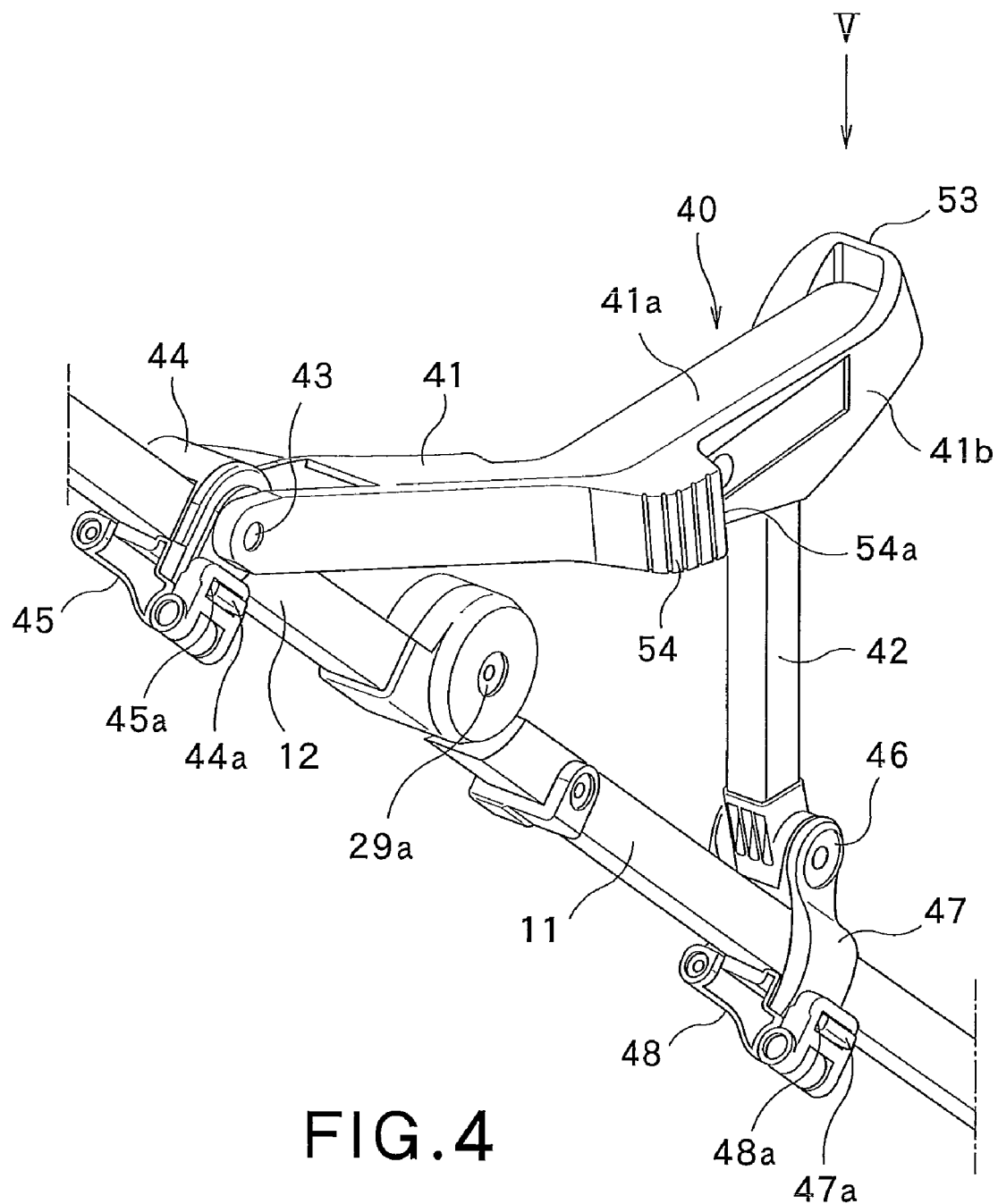
FIG. 4 is a perspective inner side view of one armrest of a pair of armrests provided in the stroller.
Figure 5:
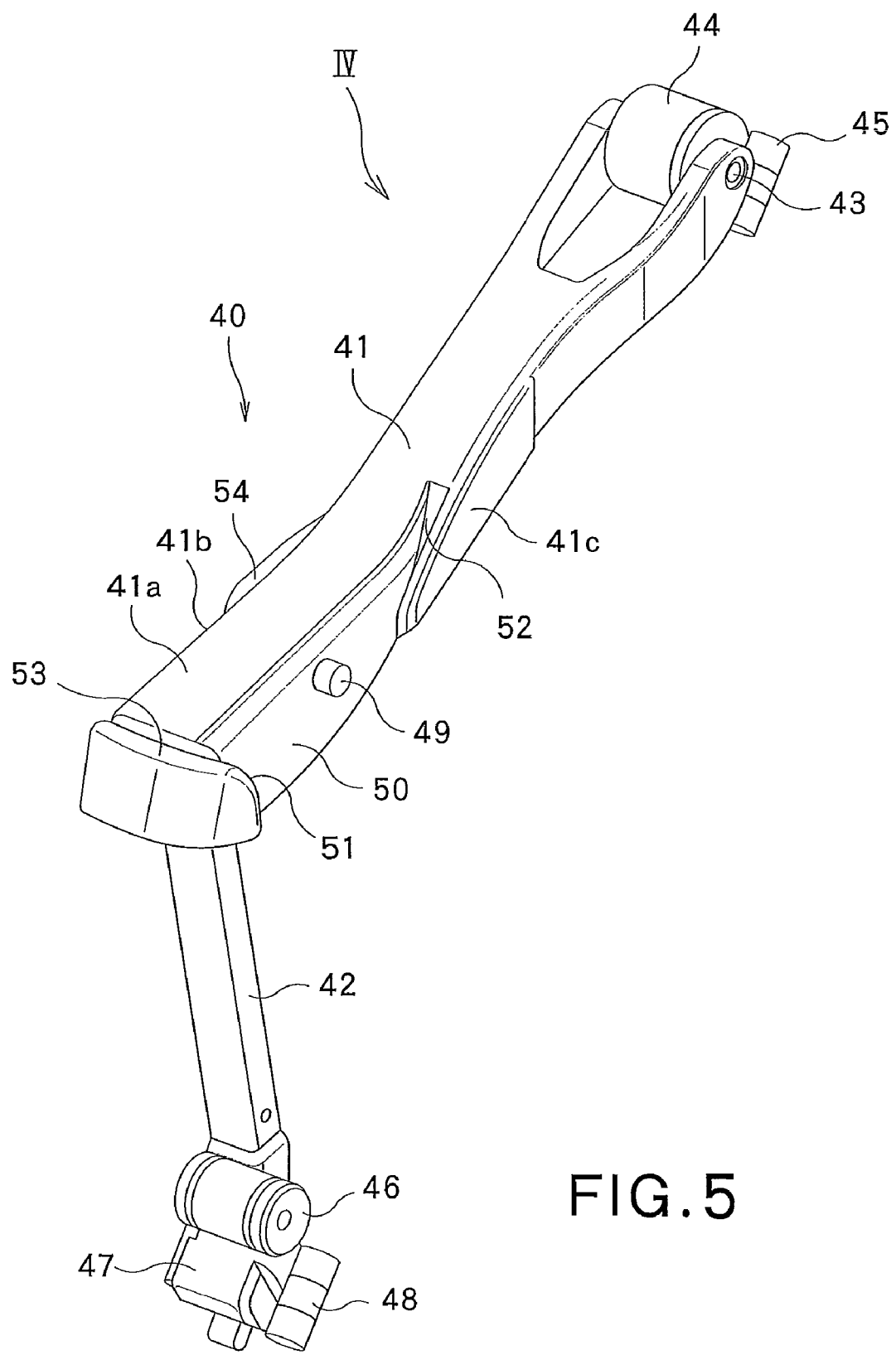
FIG. 5 is a perspective outer side view of the armrest.

The armrest 40 shown in FIGS. 4 through 6 includes an armrest body 41 pivotably mounted to the handle 12, and a support level 42 pivotably mounted to the front leg 11 and pivotable with respect to the armrest body 41.

A first connecting member 44 is pivotably mounted to the armrest body 41 via a first pivot shaft 43. The first connecting member 44 is provided with a first locking lever 45. The first locking lever 45 can be locked and the first connecting member 44 can be mounted in a predetermined position on the handle 12 by fitting a protrusion 44a of the first connecting member 44 into a hole 45a of the first locking lever 45. The first locking lever 45 can be unlocked and the first connecting member 44 can be detached from the handle 12 by disengaging the protrusion 44a of the first connecting member 44 from the hole 45a of the first locking lever 45.

On the other hand, a second connecting member 47 is pivotably mounted to the support lever 42 via a second pivot shaft 46. The second connecting member 47 is provided with a second locking lever 48. The second locking lever 48 can be locked and the second connecting member 47 can be mounted in a predetermined position on the front leg 11 by fitting a protrusion 47a of the second connecting member 47 into a hole 48a of the second locking lever 48. The second locking lever 48 can be unlocked and the second connecting member 47 can be detached from the front leg 11 by disengaging the protrusion 47a of the second connecting member 47 from the hole 48a of the second locking lever 48.

Figure 6A:
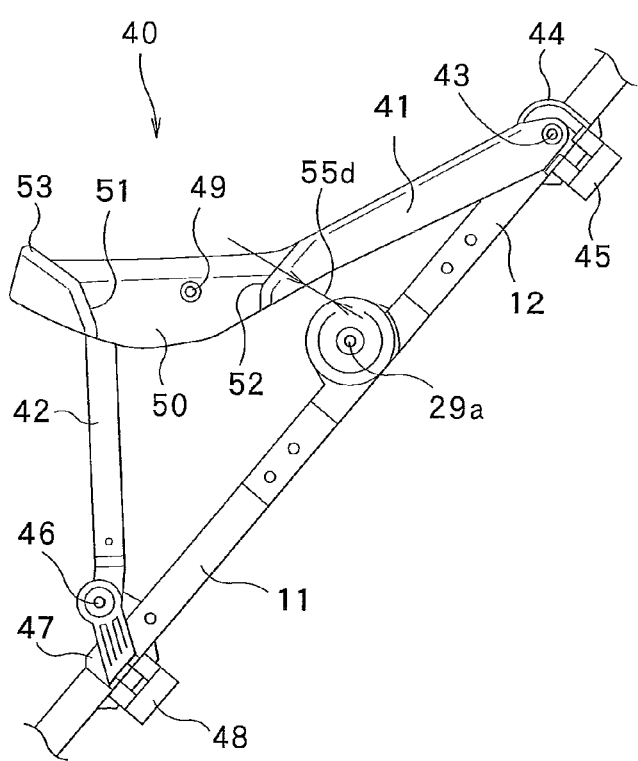
FIG. 6A is a side view of the armrest in an unfolded state.
Figure 6B:
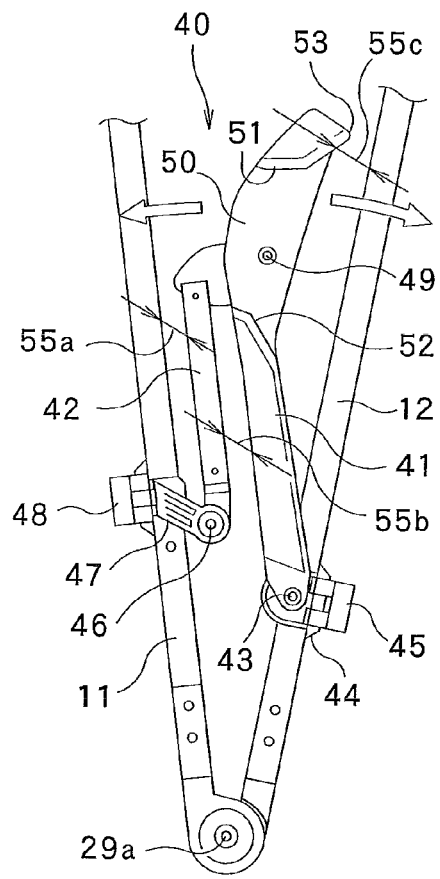
FIG. 6B is a side view of the armrest in a folded state.
Figure 7:
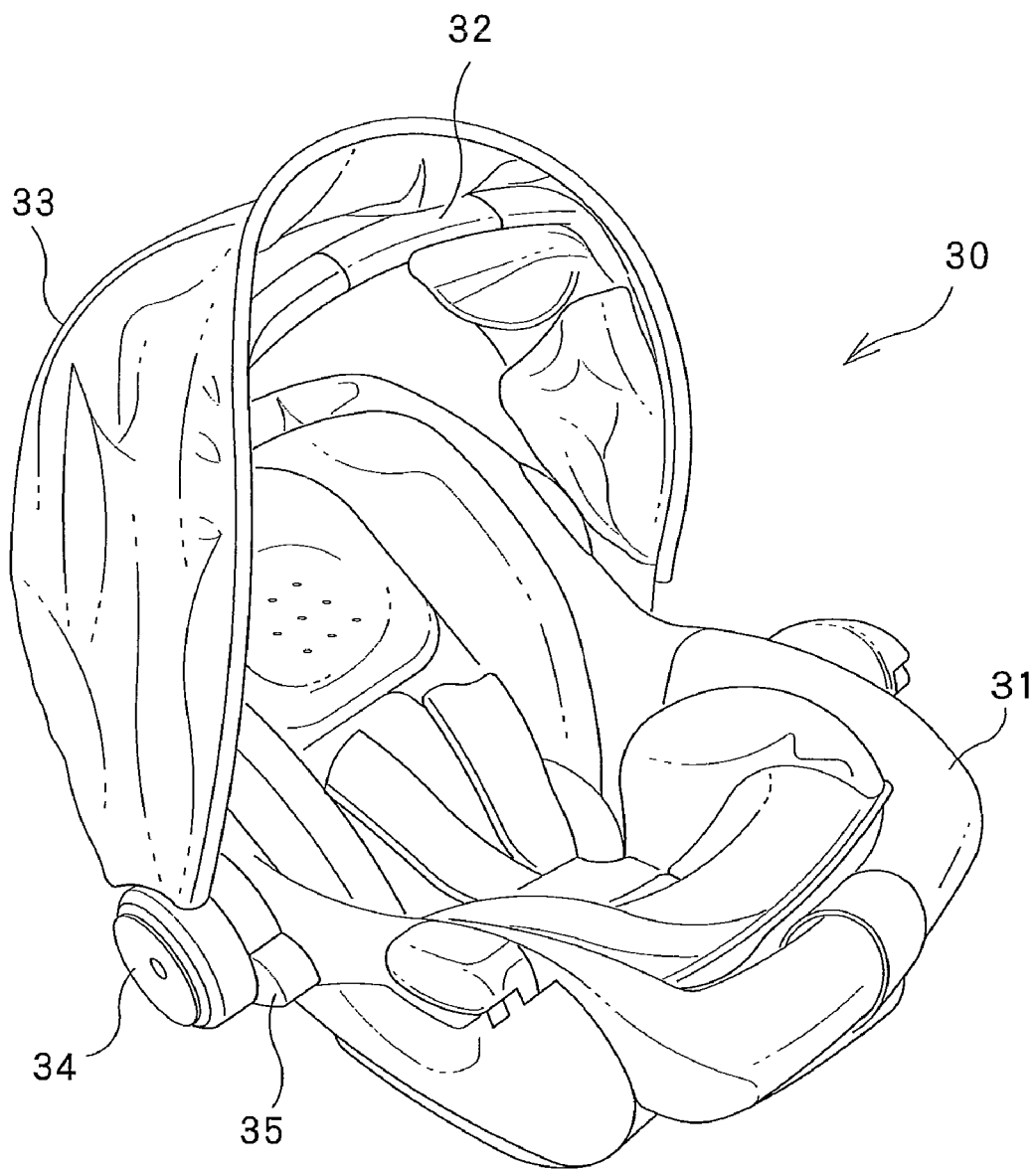
FIG. 7 is a perspective view of a child seat provided in the stroller.

As shown in FIGS. 5, 6A and 6B, a protruding pin 49, protruding outward and having a columnar shape, is provided in the outer side surface 41c of the armrest body 41 of the armrest 40. The protruding pin 49 is to engage a locking device 34 of a child seat 30 to thereby secure the child seat 30 to the armrest 40, as will be described later.

Further, as shown in FIGS. 5, 6A and 6B, a housing recess 50 is formed in the outer side surface 41c of the armrest body 41 of the armrest 40. The housing recess 50 is to house the locking device 34 of the below-described child seat 30 when the child seat 30 is attached to the armrest 40. The above-described protruding pin 49 is provided in the housing recess 50.

The housing recess 50 has an anterior slope 51 positioned anteriorly in the direction of forward movement of the stroller 10, and a posterior slope 52 positioned posteriorly in the direction of forward movement of the stroller 10. Because of the presence of the anterior slope 51 and the posterior slope 52, the interior length of the housing recess 50 gradually decreases with the depth.

A first engagement portion 53, projecting upwardly from the upper surface 41a of the armrest body 41, is provided at the front end of the armrest body 41 of the armrest 40. The first engagement portion 53 is positioned anterior to the housing recess 50. Thus, when the child seat 30 is attached to the armrest 40 as described below, the first engagement portion 53 is located anterior to the locking device 34. The first engagement portion 53 is formed continuously and integrally with the anterior slope 51.

On the other hand, as shown in FIG. 4, a second engagement portion 54 is formed in the inner side surface 41b of the armrest body 41 of the armrest 40. The second engagement portion 54 is positioned posterior to the first engagement portion 53. Thus, when the child seat 30 is attached to the armrest 40 as described below, the second engagement portion 54 is located inside the locking device 34. The second engagement portion 54 is formed in the shape of a protrusion protruding inwardly from the inner side surface 41b. The second engagement portion 54 has, at the front end, a vertically-extending flat engagement surface 54a.

As shown in FIGS. 6A and 6B, the armrest body 41 and the support lever 42 pivot with respect to each other upon conversion of the stroller 10 between the unfolded state and the folded state. This allows the armrest 40 to take on the unfolded state (FIG. 6A) and the folded state (FIG. 6B).

Referring to the folded state shown in FIG. 6B, the armrest 40 is folded as the front leg 11 and the handle 12 are folded, whereby the front leg 11, the support lever 42, the armrest body 41 and the handle 12 come close to each other. Upon the folding of the stroller 10, such gaps 55a, 55b and 55c as not to catch a finger are formed between the front leg 11 and the support lever 42 of the armrest 40, between the support lever 42 of the armrest 40 and the armrest body 41 and between the armrest body 41 of the armrest 40 and the handle 12, respectively. Accordingly, there is no fear of a user's finger being caught in the gaps 55a, 55b, 55c when the user folds the stroller 10.

Also in the unfolded state shown in FIG. 6A, such a gap 55d as not to catch a finger is formed between the armrest body 41 and the first pivot section 29a. Accordingly, there is no fear of a user's finger being caught in the gap 55d between the armrest body 41 and the first pivot section 29a when the user opens the stroller 10. As described above, the expression "such a gap as not to catch a finger" refers to a gap having a width which is larger than an ordinary user's finger diameter, for example, a width of 14 mm or more.

The stroller 10 of this embodiment further includes a child seat 30 which is attachable and detachable to and from the pair of armrests 40. The construction of the child seat 30 will now be described with reference to FIGS. 7 through 10.

The child seat 30 includes a child seat body 31 for putting an infant therein, a child seat handle 32 mounted pivotably with respect to the child seat body 31, and a hood 33 mounted openably/closably with respect to the child seat body 31.

Locking devices 34 are provided on both sides of the child seat body 31. Each locking device 34 is to engage the above-described protruding pin 49 of each armrest 40, whereby the child seat 30 can be secured to the pair of armrests 40. Beside each locking device 34 is provided an attachment/detachment lever 35 for releasing the lock between the locking device 34 and the protruding pin 49, thereby detaching the child seat 30 from the armrest 40.

Figure 10:
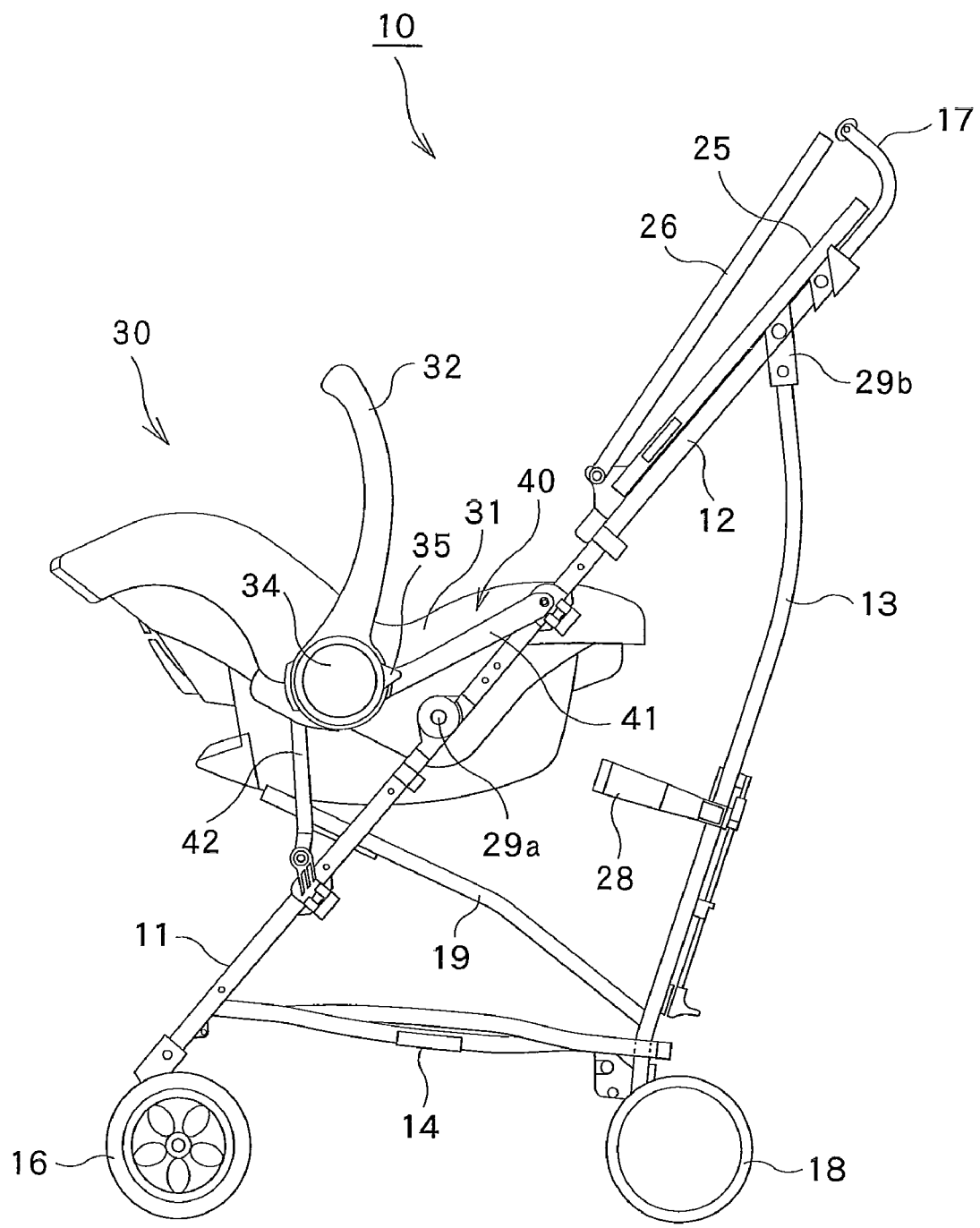
FIG. 10 is a side view of the stroller with the child seat attached to the armrests.

As described above, the child seat 30 is attached to the armrests 40 by causing each locking device 34 of the child seat 30 to engage the corresponding protruding pin 49 of the armrest 40 (see FIG. 10). When the child seat 30 is attached to the armrests 40 of the stroller 10, an infant in the child seat body 31 faces the rear side of the stroller 10 (face-to-face manner).

Figure 8:
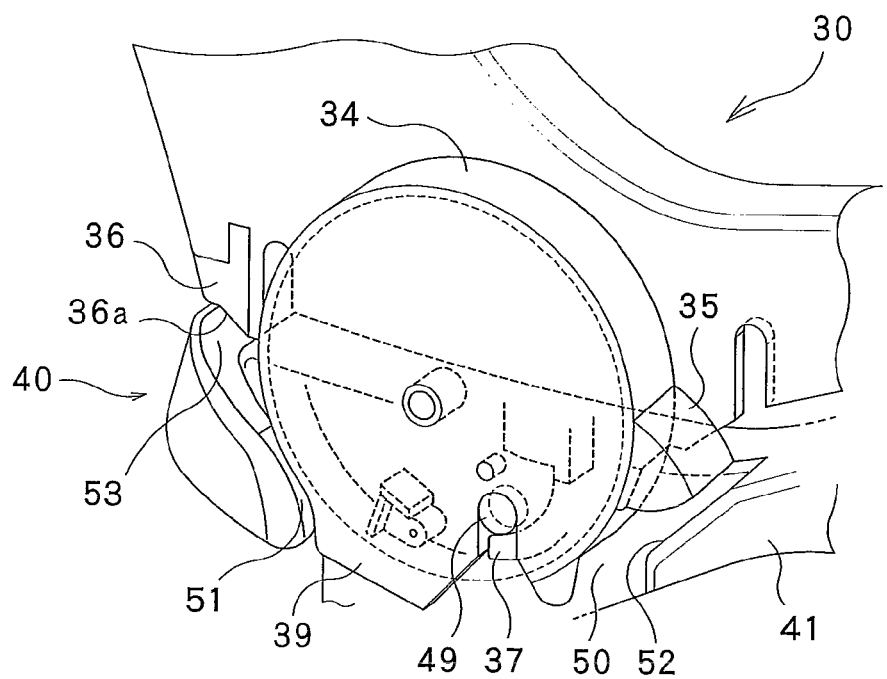
FIG. 8 is an enlarged perspective outer side view of a portion of the armrest with the child seat attached thereto.
Figure 9:
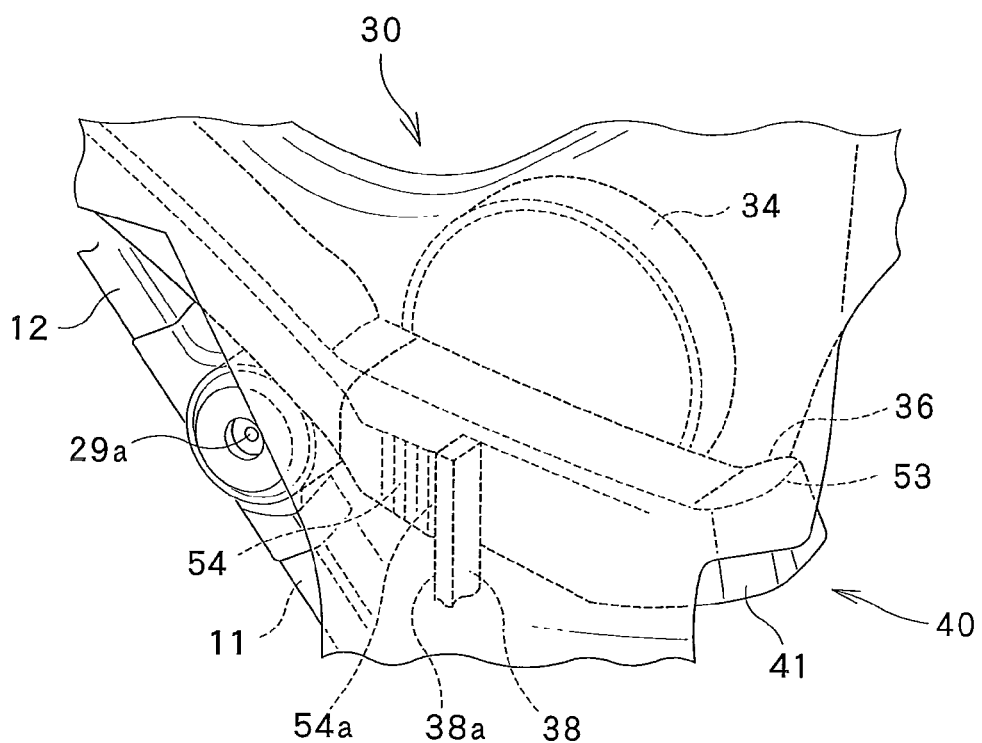
FIG. 9 is an enlarged perspective inner side view of a portion of the armrest with the child seat attached thereto.

A description will now be made of the structure of the locking device 34, the protruding pin 49 and their vicinity when the child seat 30 is attached to the armrests 40, referring to FIGS. 8 and 9. With reference to FIGS. 8 and 9, as with FIGS. 4 through 6, a description will be made solely of the locking device 34 and the armrest 40, positioned on the left side of the stroller 10 as viewed from the back of the stroller 10. The construction is the same with the locking device 34 and the armrest 40 positioned on the right side of the stroller 10.

As shown in FIG. 8, each locking device 34 has a locking member 37 that engages and disengages the protruding pin 49 in conjunction with the operation of the attachment/detachment lever 35. When attaching the child seat 30 to the armrest 40, the locking member 37 of the locking device 34 firmly engages the protruding pin 49 of the armrest body 41, whereby the child seat 30 can be secured to the armrest 40. On the other hand, the child seat 30 can be detached from the armrest 40 by releasing the attachment/detachment lever 35 and thereby disengaging the locking member 37 of the locking device 34 from the protruding pin 49 of the armrest body 41.

As described above, the armrest body 41 of the armrest 40 has the first engagement portion 53. The first engagement portion 53 is located at the front end of the armrest body 41 and, when the child seat 30 is attached to the armrest 40, is located anterior to the locking device 34.

As show in FIG. 8, a first contact portion 36 that engages the first engagement portion 53 of the armrest 40 is provided anterior to the locking device 34. The first contact portion 36 has a shape corresponding to the first engagement portion 53. Thus, the first contact portion 36 has a sloped lower surface 36a for contact with the first engagement portion 53.

A guide member 39 is provided at a lower portion of the locking device 34. When attaching the child seat 30 to the armrest 40, the guide member 39 slides on the anterior slope 51 of the housing recess 50. After attachment of the child seat 30, the guide member 39 is in engagement with the anterior slope 51.

As shown in FIG. 9, the armrest body 41 of the armrest 40 has the second engagement portion 54 located posterior to the first engagement portion 53. Further, as shown in FIG. 9, a second contact portion 38 (rib) that engages the second engagement portion 54 of the armrest 40 is provided inside the locking device 34 of the child seat 30. The second contact portion 38 has a shape corresponding to the second engagement portion 54. Thus, the second contact portion 38 has a vertical surface 38a for contact with the engagement surface 54a of the second engagement portion 54.

The operation of the thus-constructed stroller 10 of this embodiment will now be described.

First, the pair of armrests 40 is attached to the front legs 11 and the handles 12. The first locking lever 45 and the second locking lever 48 of each armrest 40 have been released.

Next, the armrest body 41 of each armrest 40 is placed in a predetermined position on each front leg 11 and the first locking lever 45 is locked, thereby fixing the first connecting member 44 of each armrest body 41 in a predetermined position on each handle 12 (see FIG. 4).

Similarly, the support lever 42 of each armrest 40 is placed in a predetermined position on each front leg 11 and the second locking lever 48 is locked, thereby fixing the second connecting member 47 of each support lever 42 in a predetermined position on each front leg 11 (see FIG. 4). In this manner the pair of armrests 40 is secured to the front legs 11 and the handles 12.

The operation of attaching the child seat 30 to the pair of armrests 40 will now be described with reference to FIG. 11A through FIG. 11C.

First, the child seat 30 is made to face in the opposite direction from the direction of forward movement of the stroller 10. The child seat 30 is then lowered toward the pair of armrests 40 (FIG. 11A).

Next, each guide member 39 of the child seat 30 is slid obliquely downward along the anterior slope 51 of the housing recess 50. During this operation, each locking device 34 approaches the protruding pin 49 of each armrest body 41 (FIG. 11B).

Each locking device 34 is finally housed in the housing recess 50 and, at the same time, the locking device 34 is caused to engage the protruding pin 49. The child seat 30 is thus pushed down against and fixed in the pair of armrests 40. By the "push-down" operation, the locking member 37 of each locking device 34 engages the protruding pin 49, whereby the protruding pin 49 is locked by the locking device 34. In this manner the child seat 30 is attached to the pair of armrests 40 (FIG. 11C).

Further, upon the attachment operation, the first engagement portion 53 of each armrest 40 engages each first contact portion 36 of the child seat 30 (FIG. 8) and, in addition, the second engagement portion 54 of each armrest 40 engages each second contact portion 38 of the child seat 30 (FIG. 9).

In the operation of attaching the child seat 30 to the pair of armrests 40, if the "push-in" of the child seat 30 is insufficient, there is a fear of insufficient engagement of the locking member 37 of each locking device 34 with the protruding pin 49. Thus, there may be a case where each locking device 34 is apparently housed in the housing recess 50, but in fact one or both of the locking devices 34 are off the protrusion pin(s) 49 of the armrest(s) 40.

According to this embodiment, however, when the child seat 30 is attached to the pair of armrests 40, the first engagement portion 53 of each armrest 40 is in engagement with each first contact portion 36 of the child seat 30 (see FIG. 8) and supports the first contact portion 36. This prevents the child seat 30 from turning forward (in a counterclockwise direction in FIG. 8). Further, the second engagement portion 54 of each armrest 40 is in engagement with each second contact portion 38 of the child seat 30 (see FIG. 9) and supports the second contact portion 38. This prevents the child seat 30 from turning forward (in a clockwise direction in FIG. 9). There is thus no fear of the child seat 30 rotating forward and falling off the pair of armrests 40 accidentally even when at least one of the locking members 37 of the locking devices 34 is off the protruding pin 49 of the armrest 40.

A description will now be made of the operation of detaching the child seat 30 from the pair of armrests 40.

First, the pair of attachment/detachment levers 35, each provided beside each locking device 34, is pulled up to release the engagement between the locking member 37 of each locking device 34 and the protruding pin 49. Next, the child seat handle 32 of the child seat 30 is gripped by hands, and the child seat 30 is pulled upward from the pair of armrests 40. In this manner the child seat 30 is detached from the pair of armrests 40.

It is possible to put an infant in the seat 23 of the stroller 10 with the armrests 40 remaining attached thereto, that is, use the stroller 10 as an armrest-equipped stroller. On the other hand, the pair of armrests 40 may be detached from the stroller 10 when the armrests 40 are not necessary.

When detaching the armrests 40, the lock of the first locking lever 45 is first released to detach the first connecting member 44 of each armrest body 41 from each handle 12. Similarly, the lock of the second locking lever 48 is released to detach the second connecting member 47 of each support lever 42 from each front leg 11. In this manner the pair of armrests 40 is detached from the front legs 11 and the handles 12. Thus, the stroller 10 can also be used as a non-armrest stroller.

As described hereinabove, according to this embodiment, the pair of armrests 40 is provided, each between each handle 12 and the front leg 11 corresponding to the handle 12, such that each armrest 40 is attachable and detachable to and from the handle 12 and the front leg 11. This enables attachment of the armrests 40 to the stroller 10 only during use of the armrests 40 and detachment of the armrest 40 during nonuse thereof.

According to this embodiment, owing to the provision of the child seat 30 which is attachable and detachable to and from the pair of armrests 40, the child seat 30 can be attached to the stroller 10 without using particular attachments. Because the armrests 40 are detachable, they can be detached from the stroller 10 when the child seat 30 is not used. This can reduce the weight of the stroller 10.

According to this embodiment, the first engagement portions 53 of the armrests 40 engage the pair of first contact portions 36 of the child seat 30 and the second engagement portions 54 of the armrests 40 engage the pair of second contact portions 38 of the child seat 30. This can prevent the child seat 30 from accidentally falling off the pair of armrests 40 even when the child seat 30 is not properly attached to each armrest 40 and at least one of the locking devices 34 is off the protruding pin 49 of the armrest 40. The safety of the stroller 10 can thus be enhanced.

According to this embodiment, when folding the stroller 10, such gaps 55a, 55b and 55c as not to catch a finger are formed between the front leg 11 and the support lever 42 of the armrest 40, between the support lever 42 of the armrest 40 and the armrest body 41 and between the armrest body 41 of the armrest 40 and the handle 12, respectively. Accordingly, there is no fear of a user's finger being caught in the gaps 55a, 55b, 55c when the user folds the stroller 10. The safety of the stroller 10 is thus enhanced.

Furthermore, according to this embodiment, such a gap as not to catch a finger is formed between the first rear stay 21 and each link arm 62, 64 and between each link arm 62, 64 and the second rear stay 22 in the stroller 10 in a folded state. This prevents a user's finger from being caught in the gap upon folding of the stroller 10. Thus, the safety of the stroller 10 can be further enhanced.

What is claimed is:

1. A stroller comprising:
   a pair of front legs;
   a pair of handles, each of the pair of handles being pivotably mounted to one of the pair of front legs via a first pivot section;
   a pair of rear legs pivotably mounted to the pair of handles; and
   an X-shaped hinge, coupled to the pair of front legs and the pair of rear legs, for converting the pair of front legs and the pair of rear legs from an unfolded state to a folded state,
   wherein a pair of armrests is provided, each armrest being between a handle and a front leg corresponding to the handle, such that each armrest is attachable and detachable to and from the handle and the front leg,
   wherein each armrest includes an armrest body attachable and detachable to and from the handle via a first connecting member, and a support lever attachable and detachable to and from the front leg via a second connecting member and pivotable with respect to the armrest body, and
   wherein each of the first pivot sections is located between the first connecting member and the second connecting member.

2. The stroller according to claim 1, wherein a seat, including a seat bottom and a seat back, is provided between the pair of front legs and the pair of handles.

3. The stroller according to claim 2 further comprising a pair of connecting pipes each connecting each front leg and each rear leg, wherein the seat bottom of the seat is supported by the pair of connecting pipes and the seat back of the seat is held by a suspender belt mounted to the pair of handles.

4. The stroller according to claim 1 further comprising a child seat which is attachable and detachable to and from the pair of armrests.

5. The stroller according to claim 4, wherein an outwardly-protruding pin is provided on the outer side surface of each armrest, the child seat has locking devices, which each engage each of the protruding pins to secure the child seat to the pair of armrests, and the locking devices are provided on both sides of the child seat.

6. The stroller according to claim 5, wherein each armrest has a first engagement portion at its front end and a second engagement portion located posterior to the first engagement portion, and the child seat has a pair of first contact portions each for contact with the first engagement portion of each armrest, and a pair of second contact portions each for contact with the second engagement portion of each armrest, and wherein the first engagement portions of the armrests engage the pair of first contact portions of the child seat and the second engagement portions of the armrests engage the pair of second contact portions of the child seat so as to prevent the child seat from falling off the pair of armrests when at least one of the locking devices is off the corresponding protruding pin of the armrest.

7. The stroller according to claim 1, wherein, when folding the stroller, a gap positioned so as not to catch a finger is formed between each front leg and the support lever of each armrest, between the support lever of each armrest and the armrest body and between the armrest body of each armrest and each handle.

8. The stroller according to claim 5, wherein a housing recess for housing the locking device is formed in one side surface of each armrest.

9. The stroller according to claim 8, wherein the housing recess has an anterior slope positioned anteriorly in the direction of forward movement of the stroller, and a posterior slope positioned posteriorly in the direction of forward movement of the stroller.

10. A stroller comprising:
    a pair of front legs;
    a pair of handles pivotably mounted to the pair of front legs;
    a pair of rear legs pivotably mounted to the pair of handles;
    an X-shaped hinge, coupled to the pair of front legs and the pair of rear legs, for converting the pair of front legs and the pair of rear legs from an unfolded state to a folded state,
    a pair of armrests, each armrest being between a handle and a front leg corresponding to the handle, such that each armrest is attachable and detachable to and from the handle and the front leg, each armrest having an outer side surface which faces outwardly from the stroller and an inner side surface which faces the interior of the stroller;
    a child seat, which is attachable and detachable to and from the pair of armrests, provided on the pair of armrests; and
    an outwardly-protruding pin is provided on the outer side surface of each armrest,
    wherein the child seat has locking devices and attachment/detachment levers, each of the locking devices engaging one of the protruding pins to secure the child seat to the pair of armrests,
    wherein the locking devices are provided on both sides of the child seat, and each of the attachment/detachment levers is provided for releasing the lock between the locking device and the protruding pin, thereby detaching the child seat from the armrest.

11. The stroller according to claim 10, wherein each armrest has a first engagement portion at its front end and a second engagement portion located posterior to the first engagement portion, and the child seat has a pair of first contact portions, each first contact portion contacting with the first engagement portion of one of the pair of armrests, and a pair of second contact portions, each second contact portion contacting with the second engagement portion of one of the pair of armrests, and
    wherein the first engagement portions of the armrests engage the pair of first contact portions of the child seat and the second engagement portions of the armrests engage the pair of second contact portions of the child seat so as to prevent the child seat from falling off the pair of armrests when at least one of the locking devices is off the corresponding protruding pin of the armrest.

12. The stroller according to claim 10, wherein a housing recess for housing the locking device is formed in the outer side surface of each armrest.

13. The stroller according to claim 12, wherein the housing recess has an anterior slope positioned anteriorly in the direction of forward movement of the stroller, and a posterior slope positioned posteriorly in the direction of forward movement of the stroller.

14. A stroller comprising:
a pair of front legs;
a pair of handles pivotably mounted to the pair of front legs;
a pair of rear legs pivotably mounted to the pair of handles;
an X-shaped hinge, coupled to the pair of front legs and the pair of rear legs, for converting the pair of front legs and the pair of rear legs from an unfolded state to a folded state,
a pair of armrests, each armrest being between a handle and a front leg corresponding to the handle, such that each armrest is attachable and detachable to and from the handle and the front leg, each armrest having an outer side surface which faces outwardly from the stroller and an inner side surface which faces the interior of the stroller;
a child seat, which is attachable and detachable to and from the pair of armrests, provided on the pair of armrests; and
an outwardly-protruding pin provided on the outer side surface of each armrest,
wherein the child seat has locking devices, each of the locking devices engages each of the protruding pins to secure the child seat to the pair of armrests, the locking devices are provided on both sides of the child seat, and
wherein each armrest has a first engagement portion projecting upwardly from each armrest and provided at a front end of the armrest, and has a second engagement portion located posterior to the first engagement portion, and the child seat has a pair of first contact portions, each first contact portion contacting the first engagement portion of one of the pair of armrests, and a pair of second contact portions, each first contact portion contacting the second engagement portion of one of the pair of armrests, and the first engagement portions of the armrests engage the pair of first contact portions of the child seat and the second engagement portions of the armrests engage the pair of second contact portions of the child seat so as to prevent the child seat from falling off the pair of armrests when at least one of the locking devices is off the corresponding protruding pin of the armrest.

15. The stroller according to claim 14 wherein a housing recess for housing the locking device is formed in the outer side surface of each armrest.

16. The stroller according to claim 15, wherein the housing recess has an anterior slope positioned anteriorly in the direction of forward movement of the stroller, and a posterior slope positioned posteriorly in the direction of forward movement of the stroller.

17. A stroller comprising:
a pair of front legs;
a pair of handles pivotably mounted to the pair of front legs,
a pair of rear legs pivotably mounted to the pair of handles; and
an X-shaped hinge, coupled to the pair of front legs and the pair of rear legs, for converting the pair of front legs and the pairs of rear legs from an unfolded state to a folded state,
wherein a pair of armrests is provided, each armrest being between a handle and a front leg corresponding to the handle, such that each armrest is attachable and detachable to and from the handle and the front leg,
wherein each armrest includes an armrest body mounted to the handle, and a support lever mounted to the front leg and pivotable with respect to the armrest body, and
wherein, when folding the stroller, at which time the armrest body and the handle become substantially parallel to each other, a gap positioned so as not to catch a finger is formed between each front leg and the support lever of each armrest, between the support lever of each armrest and the armrest body and between the armrest body of each armrest and each handle.

* * * * *